United States Patent
Kim

(10) Patent No.: US 9,586,530 B2
(45) Date of Patent: Mar. 7, 2017

(54) HOLDER FOR HOLDING PORTABLE DEVICE

(71) Applicant: Sehhan Kim, Seoul (KR)

(72) Inventor: Sehhan Kim, Seoul (KR)

( * ) Notice: Subject to any disclaimer, the term of this patent is extended or adjusted under 35 U.S.C. 154(b) by 0 days.

(21) Appl. No.: 15/148,093

(22) Filed: May 6, 2016

(65) Prior Publication Data

US 2016/0325693 A1     Nov. 10, 2016

(30) Foreign Application Priority Data

May 8, 2015    (KR) .................. 10-2015-0064766

(51) Int. Cl.
    *B60R 11/00*          (2006.01)
    *B60R 11/02*          (2006.01)

(52) U.S. Cl.
    CPC ........ *B60R 11/02* (2013.01); *B60R 2011/0071* (2013.01)

(58) Field of Classification Search
    CPC ..... B60R 11/00; B60R 11/02; B60R 11/0241; B60R 2011/0071; B60R 2011/0064; B60R 2011/0075; B60R 2011/008; B60R 2011/0084

See application file for complete search history.

(56) References Cited

U.S. PATENT DOCUMENTS

| | | | | |
|---|---|---|---|---|
| 5,836,563 | A * | 11/1998 | Hsin-Yung | B60R 11/0241 248/316.4 |
| 5,903,645 | A * | 5/1999 | Tsay | B60R 11/0241 248/316.4 |
| 6,320,962 | B1 * | 11/2001 | Eisenbraun | B60R 11/0241 379/446 |
| 6,360,083 | B1 * | 3/2002 | Fan | B60R 11/0217 455/575.1 |
| 6,366,672 | B1 * | 4/2002 | Tsay | B60R 11/0241 379/446 |
| 7,418,097 | B2 * | 8/2008 | Chang | H04M 1/06 379/446 |
| 8,191,851 | B2 * | 6/2012 | Crown | B60R 11/0241 248/316.4 |
| D690,707 | S | 10/2013 | Minn et al. | |
| 9,080,714 | B2 | 7/2015 | Minn et al. | |
| 2004/0179678 | A1 * | 9/2004 | Hsu Li | B60R 11/0241 379/441 |

(Continued)

FOREIGN PATENT DOCUMENTS

KR        10-1326687        11/2013

*Primary Examiner* — Brian D Nash
(74) *Attorney, Agent, or Firm* — Sand & Sebolt

(57) ABSTRACT

A holder for holding a portable device inside a vehicle including a body portion having a fixed pad supporting one side of the portable device when placed thereon; a moving portion having a moving pad that is linearly movable between first and second positions; an elastic plate that holds the movement of the moving pad at the second position; and a button that is pushed by the portable device when placing the portable device onto the body portion to release the moving pad from a fixed state to a movable state. The moving portion may include a spring that is compressed while the moving pad moves from the first position to the second position, and moves the moving pad back to the first position from the second position by an elastic force.

6 Claims, 9 Drawing Sheets

(56) References Cited

U.S. PATENT DOCUMENTS

| | | | |
|---|---|---|---|
| 2005/0236536 A1* | 10/2005 | Fan | B60R 11/02 248/176.3 |
| 2006/0061993 A1* | 3/2006 | Fan | F21V 33/0004 362/253 |
| 2006/0278788 A1* | 12/2006 | Fan | B60R 11/02 248/309.1 |
| 2007/0262223 A1* | 11/2007 | Wang | B60R 11/0241 248/346.07 |
| 2012/0199621 A1* | 8/2012 | Yoon | B60R 11/02 224/483 |
| 2012/0267061 A1* | 10/2012 | Fan | B60R 11/00 160/368.1 |
| 2012/0267406 A1* | 10/2012 | Fan | B60R 11/02 224/482 |
| 2015/0072555 A1* | 3/2015 | Riddiford | F16M 11/041 439/575 |
| 2015/0274088 A1 | 10/2015 | Minn et al. | |

* cited by examiner

HOLDER FOR HOLDING PORTABLE DEVICE

FIELD OF THE DISCLOSURE

The present disclosure relates to a holder for holding a portable device, more specifically to a holder capable of holding a portable device inside a vehicle.

BACKGROUND OF THE DISCLOSURE

In general, portable devices, such as navigation, PMP, PDA, DMB players, electronic dictionary, cellular phone, and the like, have been minimized so that they can not only be hand-held, but also be used inside a vehicle by using a holder. Following the development of technology, portable devices have been equipped with a variety of additional functions such as navigation, playing music and videos, games, camera, schedule management, dictionary, and the like, to meet users' diverse requirements, and even provide functions of information retrieval and adding new applications.

These portable devices can be held by a holder and used inside a vehicle. For example, Korean Patent No. 10-1326687 discloses a portable device holder to be used inside vehicles. This holder can hold a portable device when an elevation holding member is manually pushed while the portable device is placed inside the holder. This requires the drivers of the vehicles to use their both hands to manipulate the holder to hold the portable device, and therefore it would not only be difficult to place the portable device to the holder while driving, but it is also troublous to go through the plurality of steps involved in placing and removing the portable device to and from the holder.

SUMMARY OF THE DISCLOSURE

One aspect of the present disclosure is to provide a holder for holding a portable device, with which a user could easily hold the portable device just by performing a simple series of movements.

Another aspect of the present disclosure is to provide a simple structured holder for holding a portable device.

One exemplary embodiment of the present disclosure is a holder for holding a portable device which is used to hold a portable device inside a vehicle, the holder comprising: a body portion having a fixed pad which supports one side of the portable device when the portable device is placed thereon; a moving portion having a moving pad which is linearly movable between a first position, which supports the other side of the portable device when placed on the body portion, and a second position, which is spaced apart from the other side of the portable device at a predetermined distance; an elastic plate which holds the movement of the moving pad at the second position; and a button which is pushed by the portable device in the process of placing the portable device onto the body portion, to release the moving pad from a fixed state to a movable state, wherein the moving portion may further comprise a spring which is compressed while the moving pad moves from the first position to the second position, and the moving portion may further comprise a spring which moves the moving pad back to the first position from the second position by an elastic force.

The body portion further comprises: a body which is engaged with the fixed pad, and provided with a guide groove, which is where the spring is located, formed on a top surface thereof; and a cover which covers the top surface of the body, and is provided with a button hole, which is where the button is to be inserted, and the moving portion further comprises: a moving base which is engaged with the moving pad; a moving shaft which is inserted into the spring, with one end engaged with the moving base; and a push portion which is fixedly engaged with the other end of the moving shaft, and further includes a fixing clip provided with a fixing protrusion, the elastic plate being disposed on a lower portion of the button; and a stopper portion, which is where a fixing groove is stopped when the moving pad is located at the second position.

The elastic plate comprises a first region which is in close contact and fixed to the body; a second region which extends in an upwardly inclining manner from one side of the first region; and a third region which extends from one side of the second region while maintaining a predetermined distance from the body, wherein the push portion and the stopper portion are provided in the third region.

The button may have a protruded height so that it is protruded over the top surface of the cover.

The spring is provided as a pair, two springs arranged side by side in parallel with each other along a moving direction of the moving pad; the moving shaft is provided as a pair, each shaft inserted into the respective spring; and the fixing clip has a first engagement region, which is where the other end of one of the moving shafts is engaged with, a second engagement region, which is where the other end of the other moving shaft is engaged with, and a fixed region, which is where the fixing protrusion is provided, the fixed region connecting the first engagement region and the second engagement region; and the button is disposed between the pair of moving shafts.

A distance between the fixed pad and the first position corresponds to one width of the portable device, and a distance between the fixed pad and the second position may be wider than one width of the portable device.

In a holder for holding a portable device according to another aspect of the present disclosure, a moving pad is moved to a position that is wider than the width of the portable device, a button is pushed when the portable device is placed onto the cover while the moving pad is fixed to said position, such fixed state of the moving pad is released by the push of the button, and the moving pad moves linearly to a position that corresponds to the width of the portable device, thereby securely holding the portable device.

A spring may be further comprised, which is compressed when the moving pad moves to a position where the interval distance is wider than the width of the portable device, and provides elastic force when the fixed state of the moving pad is released, whereby the moving pad is moved to a position corresponding to the width of the portable device.

The button protrudes over the top surface of the cover, and may further include an elastic plate which stops the movement of the moving pad by catching the fixing protrusion of the fixing clip at a position that is wider than the width of the portable device, and releases the engagement with the fixing protrusion when pressed together with the button.

The elastic plate includes a first region; a second region which extends in an upwardly inclining manner from one side of the first region; and a third region which extends from one side of the second region in a direction parallel with the first region, a push portion, which is where the lower end of the button is placed, and a stopper portion, which is where the fixing protrusion is caught when the moving pad has moved to a position having an interval distance that is wider than the width of the portable device.

As described above, the button is pressed by the portable device while it is being placed for holding. Accordingly, with the holder of the present disclosure, only a simple action is required of the user.

Further, since the portable device is held by using a combination of an elastic plate and a fixing clip, the holder has a simple structure.

According to the present disclosure, a tongs portion is provided to the holder without using an adhesive. Therefore, the holder is easy to assemble.

DETAILED DESCRIPTION OF THE PREFERRED EMBODIMENTS

Figure 1:
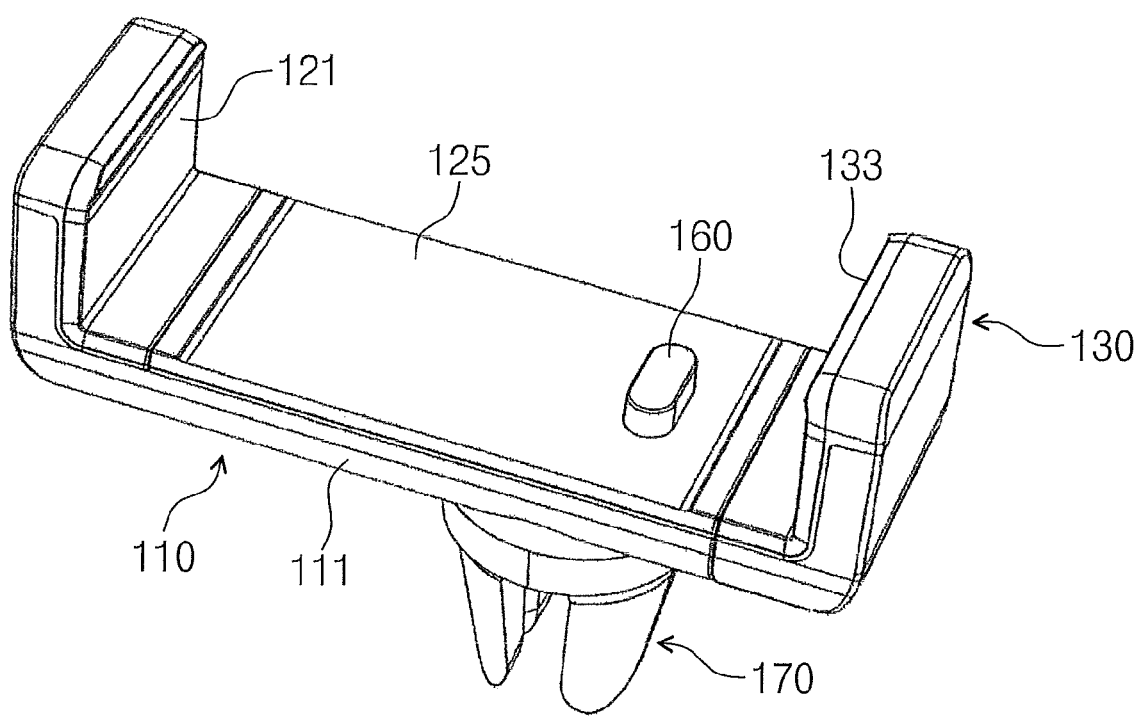
FIG. 1 is a perspective view of a holder for holding a portable device according to one exemplary embodiment of the present disclosure.

Herein, preferred embodiments of the present disclosure will be explained with reference to the accompanying drawings. However, the technical concept of the present disclosure is not limited to the embodiments described here, and may be specified into having different forms. It is to be understood that the following embodiments are only provided so that the contents of the present disclosure may be thorough and complete, and so that the technical idea of the present disclosure may be sufficiently delivered to a skilled person in the art.

In the present disclosure, when an element is described to be disposed on another element, it means that the element is directly mounted or formed on the other element, or that a third element may be interposed between the element and the other element. Further, in the drawings, the thickness of the layers and regions may be exaggerated to provide effective explanation of the technical features.

Also, in the preferred embodiments of the present disclosure, a series of numerical terms such as 'a first,' a 'second' and 'a third,' and the like, may be used to describe a variety of elements; however, it is to be understood that these numerical terms are not used to limit the described elements. These numerical terms are only used to identify one element from another. Accordingly, a first element in one embodiment may be referred to as a second element in another embodiment. It is also to be understood that each of the embodiments described and illustrated herein includes its complementary embodiments. In the present disclosure, the expression 'and/or' refers to the meaning of including 'at least one of' the elements described before and after thereof.

In the present disclosure, an element may be described in singular form only; however, it is to be understood that such description also includes the meaning that the element may exist in plural form, unless otherwise defined contextually. Further, expressions such as "comprise," "include," "have," or their conjugation, are used to define the existence of technical features, numbers, elements or an assembly thereof, not to exclude the possibility of the existence or addition of one or more other technical features, numbers, steps elements or an assembly thereof. Furthermore, in the present disclosure, the expression "connect," or its conjugation, is used as a meaning that includes both an indirect and a direct connection of a plurality of elements.

Also, in the following description, when a detailed explanation of known related function or structure is deemed to cloud the essentials of the present disclosure, such detailed explanation will be omitted.

Figure 2:
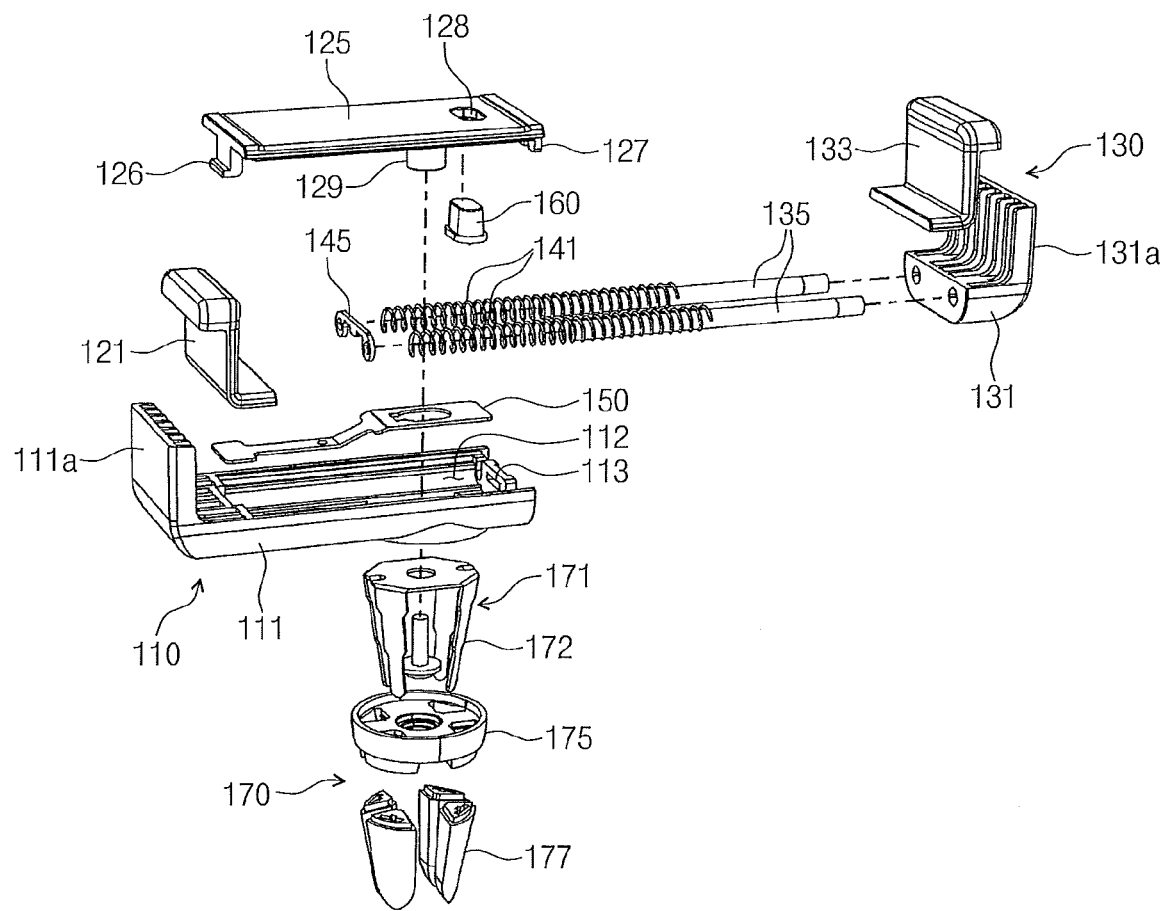
FIG. 2 is an exploded perspective view of the holder shown in FIG. 1.

FIG. 1 is a perspective view of a holder for holding a portable device according to one exemplary embodiment of the present disclosure; FIG. 2 is an exploded perspective view of the holder for holding a portable device shown in FIG. 1; and FIG. 3 is a perspective cross-sectional view which illustrates a portion of the holder for holding a portable device shown in FIG. 1.

Figure 3:
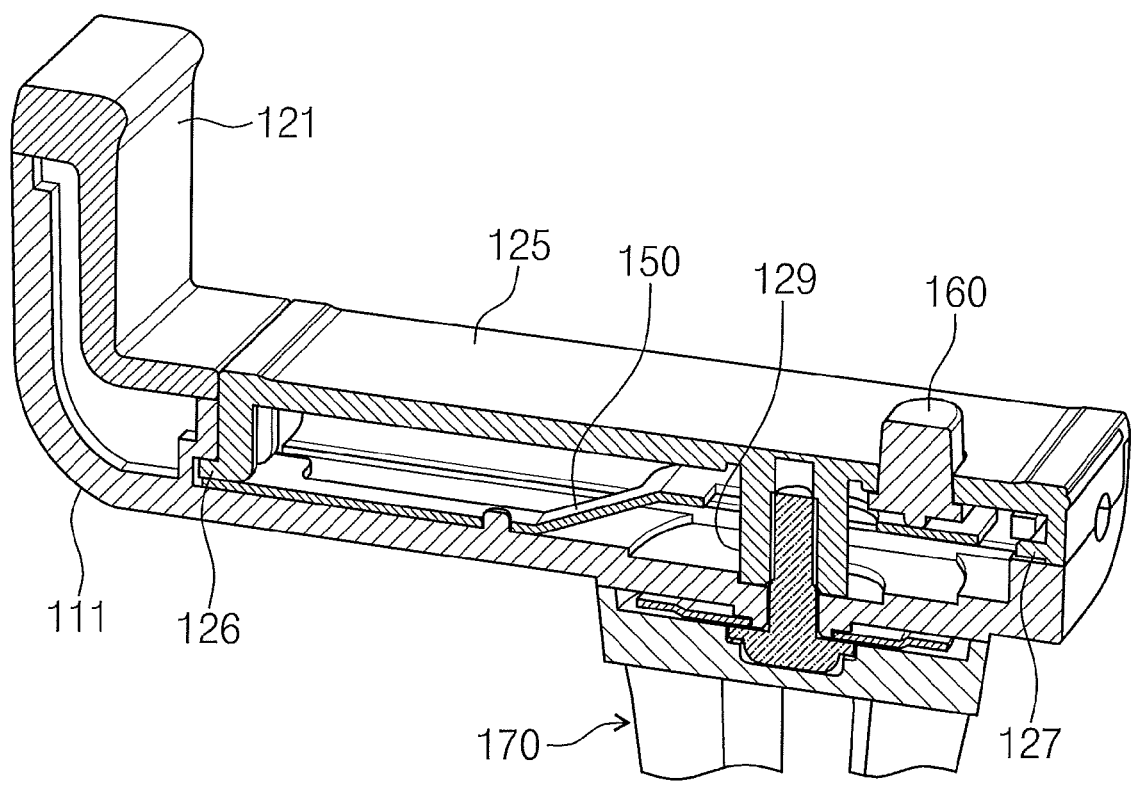
FIG. 3 is a perspective cross-sectional view which illustrates a portion of the holder shown in FIG. 1.

Referring to FIGS. 1-3, a holder for holding a portable device (10; hereinafter referred to as 'the holder') is installed inside a vehicle, and used for holding a portable device. The holder (10) may be installed to a variety of places inside a vehicle. In the exemplary embodiment, the holder (10) may be installed to an air-outlet grille in a vehicle. The portable device is a small-sized terminal device which a passenger of a vehicle could carry, and includes a mobile phone, a smart phone, a tablet PC, a navigation device, a GPS device, and the like.

The holder (10) comprises a body portion (110), a moving portion (130), an elastic plate (150), a button (160), and a tongs portion (170). The body portion (110) is where the portable device is placed. The moving portion (130) moves in one direction relative to the body portion (110) to secure a space where the portable device is to be placed, and to support the portable device once it is placed. The elastic plate (150) restricts the movement of the moving portion (130) to a fixed state. The button (160) is configured to push the elastic plate (150) in order to release the fixed state of the moving portion (130) to a movable state. The tongs portion (170) fixes the body portion (110) to an air-outlet grille in a vehicle. Hereinafter, each element will be described in more detail.

The body portion (110) includes a body (111), a fixed pad (121), and a cover (125).

The body (111) is provided as a main area where the portable device is placed. The body (111) may be made of a plastic material. The body (111) has an open top surface, and a guide groove (112) provided on the inside thereof. The guide groove (112) is provided linearly in one direction parallel with a moving direction of the moving portion (130). The guide groove (112) may be provided as a pair, two guide grooves arranged side by side in parallel with each other. A spring (141) is placed in each guide groove (112). One end (111a) of the body (111) is bent to protrude upwardly.

The fixed pad (121) is fixedly engaged to with one end of the body (111). The fixed pad (121) supports one end of the portable device. The fixed pad (121) may be made of an elastic material. For example, the fixed pad (121) may be made of a rubber material. The fixed pad (121) prevents the damages to the portable device which may be caused by collision or impact.

Figure 4:
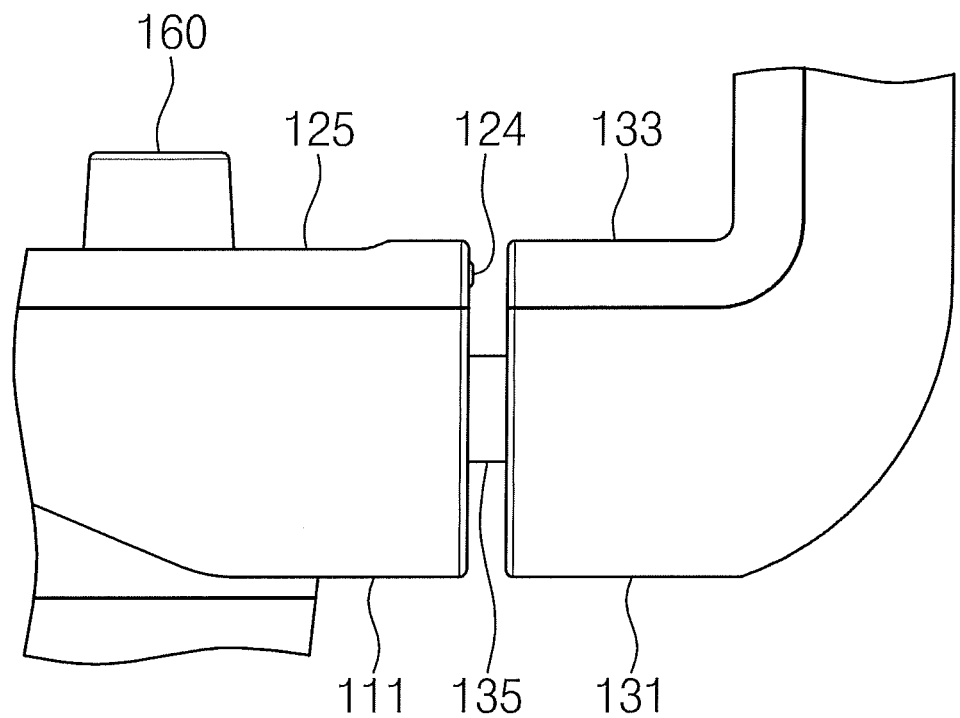
FIG. 4 is an enlarged view of a portion of the holder shown in FIG. 1.

The cover (125) covers the open top surface of the body (111). The top surface of the cover (125) is flat, and engagement protrusions (126, 127) are provided on both ends, protruding downwardly from the cover (125). When assembled with the body (111), the engagement protrusions (126, 127) are engaged with the engagement groove (113) formed on the body (111). A button hole (128) is provided on the cover (125). The button hole (128) may be provided in an area adjacent to a moving pad (133). As shown in FIG. 4, an impact reduction pad (124) is provided on one side of the cover (125). The impact reduction pad (124) is provided to relieve the impact caused by a collision with the moving pad (133) when the moving portion (130) is in linear movement.

The moving portion (130) includes a moving base (131), the moving pad (133), a moving shaft (135), the spring (141), and a fixing clip (145).

The moving base (131) is provided on the other side of the body (111), far away from the fixed pad (133). One end (131a) of the moving base (131) protrudes upwardly. One end (131a) of the moving base (131) and one end (111a) of the body (111) face each other.

The moving pad (133) is fixedly engaged with the moving base (131). The moving pad (133) is combined with the fixed pad (121) to support the portable device. The moving pad (133) and the fixed pad (121) may be formed to have the same shape, using the same material. The moving pad (133) of this embodiment is configured to prevent the damages to the portable device which may be caused by collision or impact.

The moving shaft (135) has a rod-like shape, and is linearly arranged along a moving direction of the moving pad (133). One end of the moving shaft (135) is fixedly engaged with the moving base (131). In this embodiment, the moving shaft (135) is provided as a pair, two moving shafts arranged side by side in parallel with each other.

The spring (141) is placed in the guide groove (112), and inserted into the moving shaft (135). In this embodiment, the spring (141) is provided as a pair, each spring inserted into the respective moving shaft (135).

Figure 5:
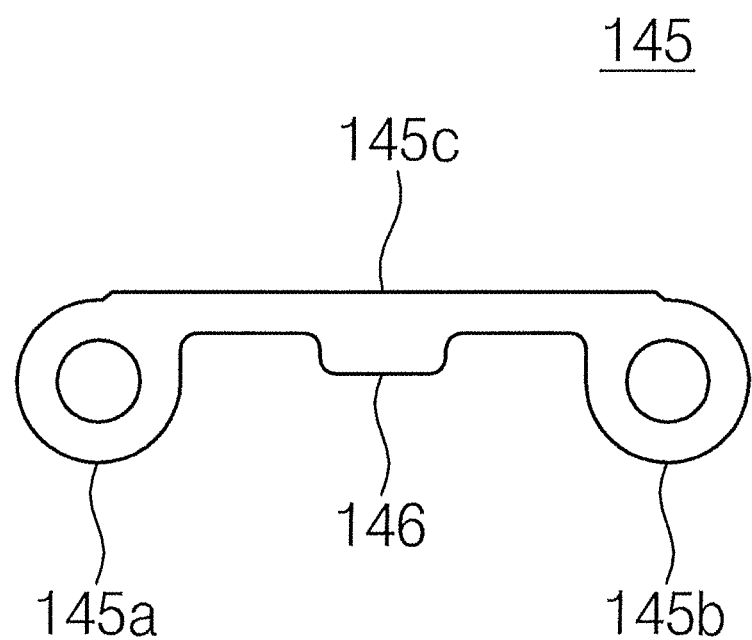
FIG. 5 is a front view of a fixing clip.

FIG. 5 is a front view of the fixing clip (145). Referring to FIGS. 2 and 5, the fixing clip (145) is fixed to the other end of the moving shaft (135), and blocks the spring (141) from falling out of the moving shaft (135). The fixing clip (145) is provided with a stopper protrusion (146). The stopper protrusion (146) may be held by a stopper portion (157) of the elastic plate (150), and in such case, the movement of the moving portion (130) is restricted to a fixed state. The fixing clip (145) has a first engagement region (145a), a second engagement region (145b), and a fixed region (145c). The first engagement region (145a) and the second engagement region (145b) are regions which respectively become engaged with the other end of the moving shaft (135). The fixed region (145c) is a region which connects the first engagement region (145a) and the second engagement region (145b), and is provided with a stopper protrusion (146).

The elastic plate (150) is disposed inside the body (111), between the body (111) and the cover (125). The elastic plate (150) is a thin elastic plate. The elastic plate (150) may be made of a plastic or metallic material.

Figure 6:
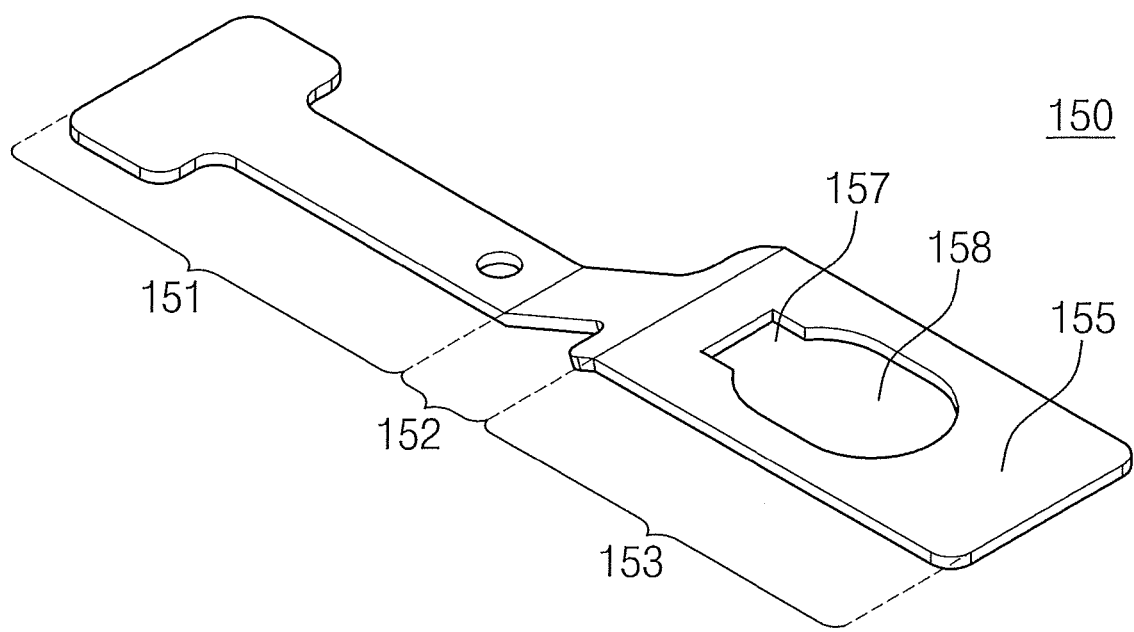
FIG. 6 is a perspective view of an elastic plate.

FIG. 6 is a perspective view of the elastic plate. Referring to FIGS. 2 and 6, the elastic plate (150) has a first region (151), a second region (152) and a third region (153). The first region (151) is a region which is in close contact and fixed to the body (111), and is provided linearly in one direction. The second region (152) extends in an upwardly inclining manner from one side of the first region (151). The third region (153) extends from one side of the second region (152) in the same direction as the length direction of the first region (151). The third region (153) is spaced apart from the body (111) at a predetermined distance. With these structural characteristics of the elastic plate (150), the third region (153) is capable of elastically moving up and down relative to the first region (151).

The elastic plate (150) is provided with a push portion (155), a stopper portion (157) and an insertion hole (158). In this embodiment, the push portion (155), the stopper portion (157) and the insertion hole (158) are provided in the third region (153). The push portion (155) is where the lower end of the button (160) is to be placed, and when the button (160) is pushed, the push portion is pushed downward together with the button (160). The stopper portion (157) is a hole formed to have a predetermined width, and the stopper protrusion (146) of the fixing clip (145) is inserted therethrough. A fastener (129), which is formed on the undersurface of the cover (125), is inserted through the insertion hole (158).

The button (160) is inserted through the button hole (128), the lower end of the button placed on the push portion (155) of the elastic plate (150) and the upper end of the button protruding over the top surface of the cover (125). The button (160) is pushed by the portable device, while the portable device is being placed on the cover (125).

The tongs portion (170) is engaged with the body (111) at a lower portion of the body (111). The tongs portion (170) includes a tongs clip (171), a holder (175) and tongs legs (177).

The tongs clip (171) is made of an elastic material. The tongs clip (171) may also be made of a metallic material. The togs clip (171) has a plurality of leg portions (172). In this embodiment, the tongs clip (171) has four leg portions. The leg portions of the tongs clip (171) are respectively inserted into a holder (175), and an end portion thereof protrudes below the holder (175).

The holder (175) is configured so that a predetermined distance is maintained among the leg portions (172) of the tongs clip (171).

The tongs legs (177) are respectively inserted into the leg portions (172) of the tongs clip (171). The tongs legs (177) may be made of a different material from the tongs clip (171). The tongs legs (177) may be made of a rubber material. With is, the tongs legs (177) are able to prevent the damages to the interior of the vehicle which may be caused by collision or impact. The tongs legs (177) are inserted into an air-outlet grille of the vehicle, and thereby the holder (10) is securely fixed to the vehicle.

Herein, a process of using the above-described holding holder to hold a portable device will be explained.

Figure 7:
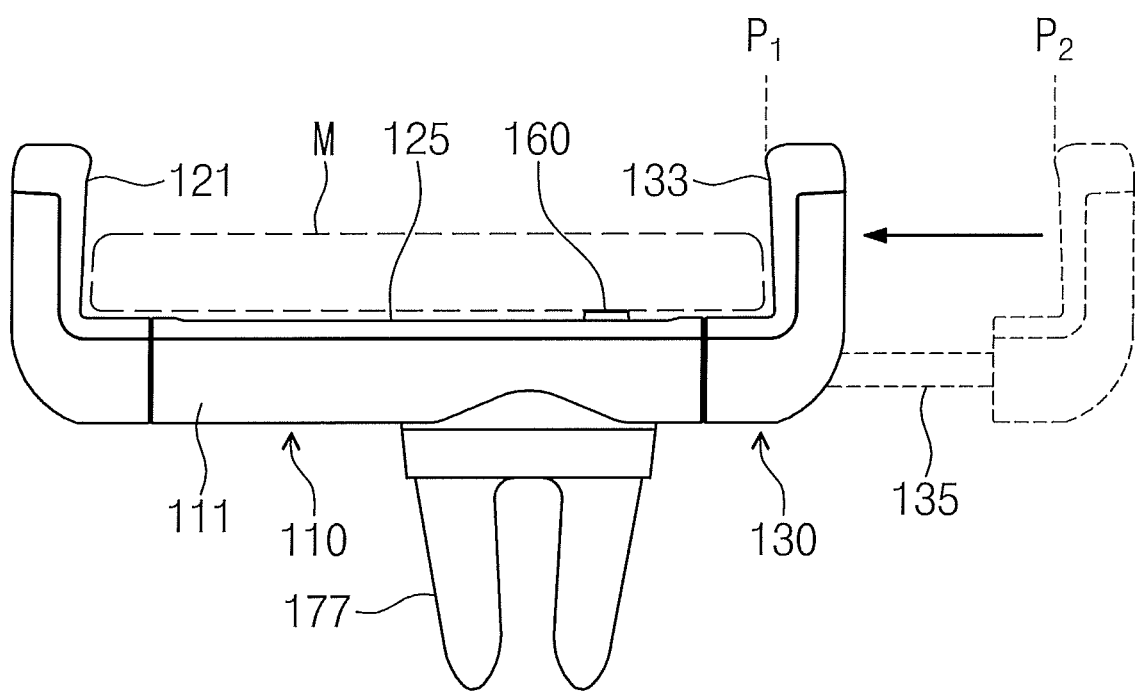
FIG. 7 is a drawing which shows a process of movement of a moving portion according to the present disclosure.
Figure 8:
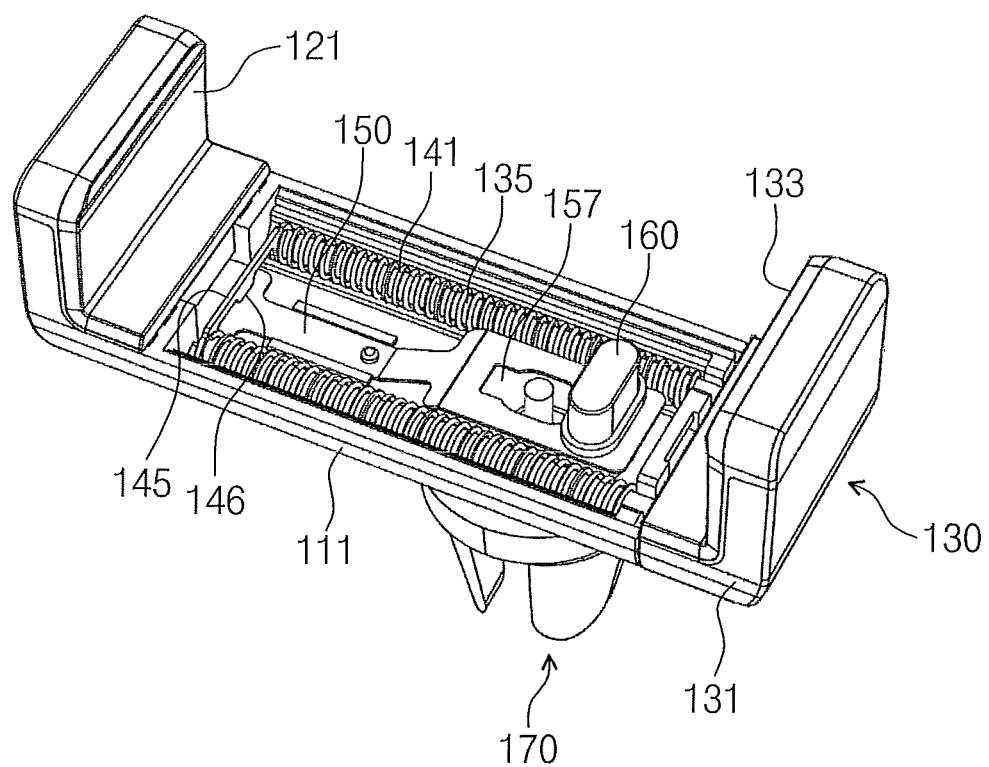
FIG. 8 is a drawing which shows the moving pad located at a position that corresponds to the width of the portable device.

FIG. 7 is a drawing which shows a process of movement of the moving portion according to this embodiment; FIG. 8 is a drawing which shows the moving pad located at a position which corresponds to the width of the portable device; and FIG. 9 is a drawing which shows the moving pad located at a position wider than the width of the portable device.

Figure 9:
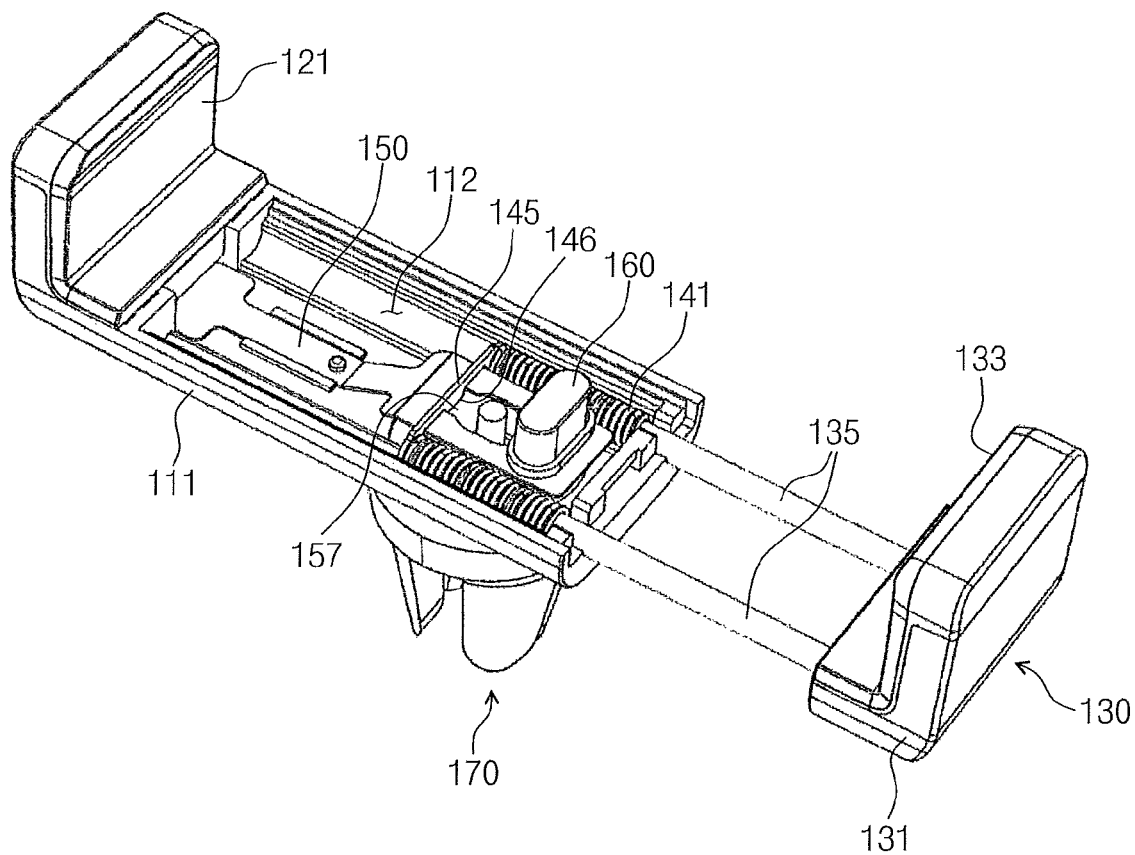
FIG. 9 is a drawing which shows the moving pad located at a position that is wider than the width of the portable device.

Referring to FIGS. 7-9, the moving pad (133) is linearly movable between a first position (P1) and a second position (P2). The first position (P1) is where the interval distance between the moving pad (133) and the fixed pad (121) corresponds to one width of a portable device (M). The moving pad (133) is assembled with the fixed pad (121) at the first position (P1) and holds the portable device (M). The second position (P2) is where the interval distance between the moving pad (133) and the fixed pad (121) is wider than one width of the portable device (M). Here, a user moves the moving portion (130) so that the moving pad (133) is located at the second position, (P2) and then places the portable device (M) on the body portion (110). Since the interval distance between the moving pad (133) and the fixed pad (121) at the second position (P2) is wider than the width of the portable device, a user may place the portable device (M) on the body portion (110) free from the interference of the moving pad (133) and the fixed pad (121).

As shown in FIG. 9, when a user holds the moving portion (130) by the hand and moves the moving pad (133) to the second position (P2), the moving shaft (135) moves to the outer side of the body portion (110) with the moving base (131), a portion of the moving shaft stays inside the body portion (110). During this process, the fixing clip (145) move outward with the moving shaft (135), and thereby the spring (141) is compressed. The fixing clip (145) is movable up to a position where the stopper portion (157) is located, and the stopper protrusion (146) is caught by the stopper portion (157), thereby restricting the movement of the moving portion (130). Even when a user takes the hand off of the moving portion (130), the stopper protrusion (146) is still caught by the stopper portion (157), and therefore the moving portion (130) is not retrieved back to the first position (P1), and the spring (141) is maintained in a compressed state.

Next, a user places the portable device (M) on the body portion (110) while the moving portion (130) is located at the second position (P2). In the process in which the portable device (M) is placed on the top surface of the cover (125), the button (160) is pushed by the portable device (M), and thereby the button (160) pushes the push portion (155) of the elastic plate (150) which is disposed at the lower end of the button. With the push portion (155) of the elastic plate (150) pushed downward, the stopper portion (157) is moved downward and releases the stopper protrusion (146), thereby delivering the elastic force of the spring (141) to the fixing clip (145). The elastic force of the spring (141) moves the fixing clip (145) toward the fixed pad (121) and in this process, the moving shaft (135), the moving base (131) and the moving pad (133) move together therewith. As shown in FIG. 8, the moving pad (133) moves to the first position (P1), and thereby secures one side portion of the portable device (M).

With the process described above, a user may easily place the portable device (M) to the holder (10). When a driver uses the holder (10) of the present disclosure to place the portable device while driving a vehicle or while the vehicle is standing, it is possible to use only one hand to place the portable device (M). When a user holds the moving portion (130) with one hand and moves it in one direction, the stopper protrusion (146) is caught by the stopper portion (157) during the movement, and thereby the moving portion (130) is automatically fixed at the second position (P2). With this, a user is not required to perform a separate movement or motion to secure the moving portion (130), and therefore the entire process can be operated with only one hand.

Further, since the button (160) is pushed by the portable device (M) when the portable device (M) is placed on the cover, it is possible to move the moving portion (130) to the first position (P1) just by placing the portable device (M) on the cover (125). That is, a motion to move the moving portion (130), for example, pushing a release button, or the like, is not required of a user, and therefore a user may simply place the portable device (M) with only one hand.

Also, since the portable device (M) is held by the movement of the moving portion (130), the first position (P1), which is where the portable device (M) is secured, may become different in accordance with the size of the portable device (M). Thus, the holder (10) is capable of holding the portable device (M) in various sizes.

DESCRIPTION OF REFERENCE NUMBERS

10: holder for holding a portable device
110: body portion
111: body
121: fixed pad
125: cover
130: moving portion
131: moving base
133: moving pad
135: moving shaft
141: spring
145: fixing clip
150: elastic plate
160: button
170: tongs portion
171: tongs clip
175: holder
177: tongs legs

What is claimed is:

1. A holder for holding a portable device which is used to hold a portable device inside a vehicle, the holder comprising:
 a body portion having a fixed pad which supports one side of the portable device when the portable device is placed thereon;
 a moving portion having a moving pad which is linearly movable between a first position, which supports the other side of the portable device when placed on the body portion, and a second position, which is spaced apart from the other side of the portable device at a predetermined distance;
 an elastic plate which holds the movement of the moving pad at the second position; and
 a button which is pushed by the portable device in the process of placing the portable device onto the body portion, to release the moving pad from a fixed state to a movable state,
 the moving portion comprising:
 a moving base which is engaged with the moving pad;
 a spring which is compressed while the moving pad moves from the first position to the second position, and moves the moving pad back to the first position from the second position by elastic force;
 a moving shaft which is inserted into the spring, with one end engaged with the moving base; and
 a fixing clip provided with a fixing protrusion, which is fixedly engaged with the other end of the moving shaft,
 wherein the elastic plate further comprises a push portion disposed at a lower portion of the button and a stopper portion having a hole shape disposed adjacent to the push portion and catches the fixing protrusion when the moving pad is located at the second position,
 the fixing clip is configured to move in a section between the fixed pad and the button along the movement of the moving shaft, and a movable range of the fixing clip is defined by an interval distance between the first position and the second position.

2. The holder according to claim 1,
wherein the body portion further comprises:
a body which is engaged with the fixed pad, and provided with a guide groove, which is where the spring is located, formed on a top surface thereof; and a cover which covers the top surface of the body, and is provided with a button hole, which is where the button is to be inserted, and
wherein the elastic plate further comprises:
a first region which is in close contact and fixed with the body;
a second region which extends in an upwardly inclining manner from one side of the first region; and
a third region, which extends from one side of the second region while maintaining a predetermined distance from the body, the push portion and the stopper portion being provided in the third region.

3. The holder according to claim 2,
wherein the spring is provided as a pair, and the pair of springs is arranged side by side to each other along a moving direction of the moving pad,
the moving shaft is also provided as a pair, and each moving shaft of the pair of moving shafts is inserted into the spring,
the fixing clip has a first engagement region which is engaged with the other end of one moving shaft; a second engagement region which is engaged with the other end of the other moving shaft; and a fixed region which connects the first engagement region and the second engagement region, and is provided with the fixing protrusion, and
the button is disposed between the pair of moving shafts.

4. The holder according to claim 1,
wherein the button is disposed more adjacent to the first position than the fixed pad, and
the stopper portion is disposed adjacent to the button in a section between the fixed pad and the button.

5. The holder according to claim 1,
wherein an interval distance between the fixed pad and the first position corresponds to one width of the portable device, and
a distance between the fixing pad and the second position is wider than one width of the portable device.

6. A holder for holding a portable device which is capable of holding the portable device through a sequence of process, in which: a moving pad is moved to a position where a distance between a fixing pad fixed to a body of the holder and the moving pad is wider than a width of the portable device; the portable device is placed on a cover while the moving pad is fixed in said position, such that a button is pushed by the portable device while being placed on the cover; the moving pad is released from a fixed state by the push of the button; and the fixing pad is linearly moved to a position corresponding to the width of the portable device, thereby securely holding the portable device,
wherein the button protrudes above a top portion of the cover,
the holder comprising:
a spring which is compressed while the moving pad moves from an open position where the distance is wider than the width of the portable device, and moves the moving pad by elastic force to a close position corresponding to the width of the portable device while the moving pad is released from a fixed state;
a moving shaft which is inserted into the spring, with one end engaged with the moving base, and having a fixing clip provided on the other end; and
an elastic plate having a plate shape which holds the movement of the moving pad in the open position where the distance is wider than the width of the portable device by being engaged with a fixing protrusion of the fixing clip, the elastic plate being pushed together with the button to release the engagement with the fixing protrusion,
wherein the elastic plate comprises:
a first region which is in close contact and fixed with the body;
a second region which extends from one side of the first region, gradually inclining upward while approaching the cover; and
a third region, which extends from one side of the second region while maintaining a predetermined distance from the body, having a push portion located on a lower portion of the button and a hole-shaped stopper portion located between the second region and the push portion, the stopper portion being caught by the fixing protrusion when the moving pad is located in the open position where the interval distance is wider than the width of the portable device,
wherein the fixing clip moves back and forth in a section between the fixing pad and the button along the moving shaft, and
a movable range of the moving pad corresponds to a movable range of the fixing clip.

* * * * *